(12) United States Patent
Donohue (10) Patent No.: US 7,708,541 B2
(45) Date of Patent: May 4, 2010

(54) HEAT FORM COILING DEVICE

(75) Inventor: Robert James Donohue, Clayton, NC (US)

(73) Assignee: Natvar Holdings, Inc., Somerville, NJ (US)

(*) Notice: Subject to any disclaimer, the term of this patent is extended or adjusted under 35 U.S.C. 154(b) by 611 days.

(21) Appl. No.: 10/574,375

(22) PCT Filed: Oct. 1, 2004

(86) PCT No.: PCT/US2004/032322

§ 371 (c)(1),
(2), (4) Date: Apr. 26, 2007

(87) PCT Pub. No.: WO2005/032799

PCT Pub. Date: Apr. 14, 2005

(65) Prior Publication Data

US 2007/0273063 A1    Nov. 29, 2007

Related U.S. Application Data

(60) Provisional application No. 60/508,024, filed on Oct. 1, 2003.

(51) Int. Cl.
B29C 53/08 (2006.01)

(52) U.S. Cl. .................................. 425/302.1

(58) Field of Classification Search ............. 425/302.1, 425/340, 319–322, 289–316, 327, 391, 384; 264/281

See application file for complete search history.

(56) References Cited

U.S. PATENT DOCUMENTS

| 2,392,842 A | * | 1/1946 | Doell ........................ 57/292 |
| 2,432,870 A | * | 12/1947 | Evalt ........................ 70/458 |
| 2,720,091 A | * | 10/1955 | Schelp ........................ 62/5 |
| 2,740,987 A | * | 4/1956 | Moncrieff ................. 264/281 |
| 3,184,795 A | * | 5/1965 | Howell, Jr. .............. 425/302.1 |
| 3,431,337 A | * | 3/1969 | Heimberger .............. 264/281 |
| 3,689,737 A | * | 9/1972 | Eckles et al. .............. 392/409 |
| 3,770,361 A | * | 11/1973 | Heimberger .............. 425/445 |
| 4,357,249 A | * | 11/1982 | Mellor ...................... 508/101 |
| 4,750,253 A | * | 6/1988 | Bleher et al. ................ 29/433 |
| 4,904,176 A | * | 2/1990 | Huvey ....................... 425/391 |
| 5,167,891 A | * | 12/1992 | Dijkman et al. ........... 264/145 |

FOREIGN PATENT DOCUMENTS

WO    WO 0102251    *    1/2001

* cited by examiner

*Primary Examiner*—Yogendra N Gupta
*Assistant Examiner*—Scott W Dodds
(74) *Attorney, Agent, or Firm*—Lerner, David, Littenberg, Krumholz & Mentlik, LLP (57) ABSTRACT

A method and apparatus for continuously producing preselected lengths of coiled tubing are disclosed. According to the method, plastic tubing is continuously wound onto a rotating main tube shaft (24). Downstream from the point where the tubing begins to wind about the shaft, a heat source (46) is directed toward the coiled tubing, softening it as it traverses thereby. Further downstream, a cool-air source (48) directed at the softened tubing sets the tubing into its coiled form. Subsequently, the coiled tubing is cut into preselected lengths by a cutter (50) downstream from the cool-air source.

20 Claims, 6 Drawing Sheets

HEAT FORM COILING DEVICE

CROSS-REFERENCE TO RELATED APPLICATIONS

This application is the U.S. National Stage of International Application No. PCT/US2004/032322, filed Oct. 1, 2004, which includes a claim for Convention priority based on U.S. patent application Ser. No. 60/508,024, filed Oct. 1, 2003.

BACKGROUND OF THE INVENTION

1. Field of the Invention

The present invention relates to plastic tubing and, more particularly, to a method for forming plastic tubing into coils and to a coiling system for practicing the method.

2. Description of the Prior Art

In the prior art, plastic tubing, such as tubing made from polyvinyl chloride (PVC), has been placed into coiled form by wrapping or coiling the tubing onto a mandrel, which may either be made of ultra-high molecular weight (UHMW) polyethylene, or have a sleeve or covering of that material, and by placing the mandrel into an oven for a suitable length of time to heat-form the tubing into a coil. Not only is this prior-art method inefficient, but it is also very labor-intensive and prohibitively expensive.

As a consequence, there has long been sought a more economical and straightforward method for producing a coil from a length of plastic tubing. Such a method is made possible with the use of the coiling system of the present invention.

SUMMARY OF THE INVENTION

Accordingly, the present invention is a coiling system for continuously forming coiled plastic tubing in desired lengths. The present invention also encompasses a method for forming lengths of coiled plastic tubing. The method may be practiced using the coiling system described below.

The coiling system comprises a main tube shaft which is rotated at a desired rate by a main drive shaft driven by a variable-speed motor. The plastic tubing is supplied either directly from an extruder or from a reel of previously extruded tubing, and is fed toward the main tube shaft through a gap in a tube guide. The gap is an opening cut at an oblique angle through the tube guide to direct the plastic tubing at an angle suitable for winding it continuously onto the main tube shaft in the form of a helix.

The coiled tubing traverses along the main tube shaft as it is wound thereabout. At one point downstream from the tube guide, a heat source is directed toward the coiled tubing, softening it as it traverses thereby. Further downstream from the heat source is a cool-air source, which is directed toward the coiled tubing and sets it into its coiled form. Subsequently, the coiled tubing is cut into desired lengths by a cutter downstream from the cool-air source.

The present invention will now be described in more complete detail with frequent reference being made to the figures identified below.

DETAILED DESCRIPTION OF THE PREFERRED EMBODIMENT

Figure 1:
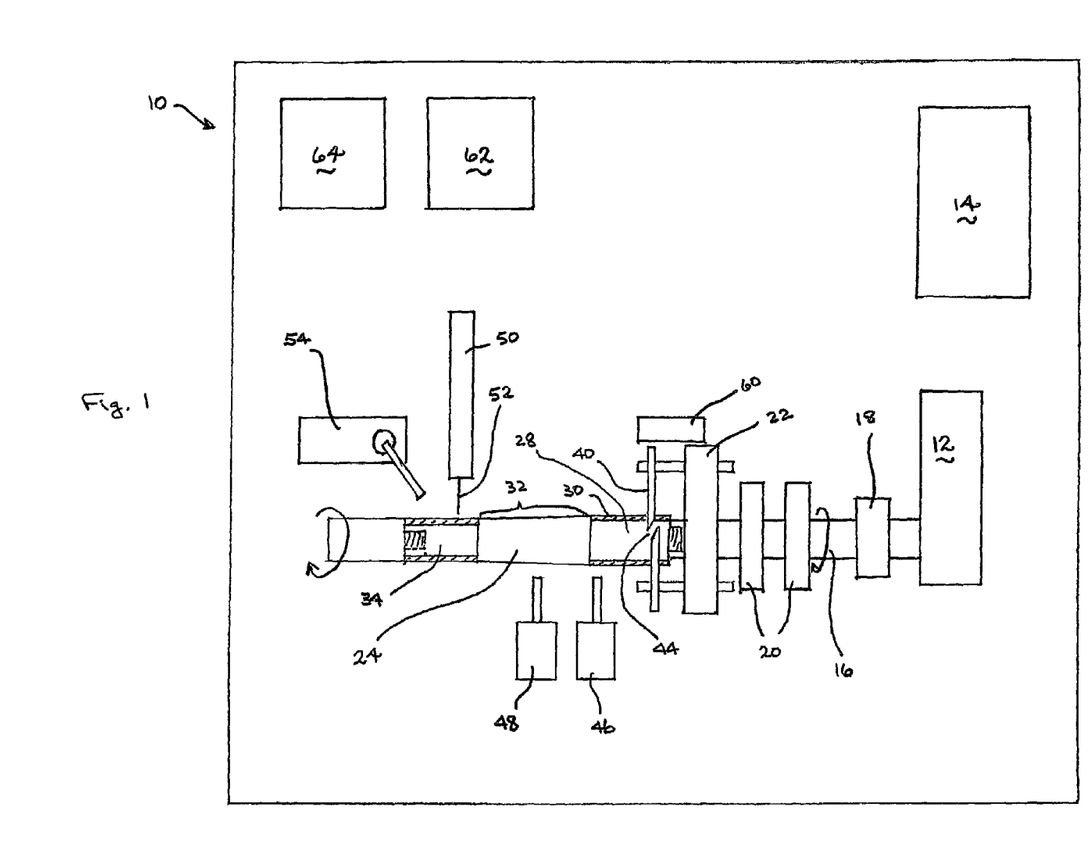
FIG. 1 is a schematic plan view of a first embodiment of the coiling system of the present invention.

Turning now to FIG. 1, a schematic plan view of the coiling system 10 of the present invention, the coiling system 10 comprises a motor 12 and a speed controller 14 therefor. Motor 12 may be set, using speed controller 14, to rotate at speeds in a range from 1 RPM (rotation per minute) to 1000 RPM.

Motor 12 is connected to a main drive shaft 16 by means of coupling 18. Main drive shaft 16 is turned by motor 12 within bearings 20, and passes through a support block 22. A main tube shaft 24 is threadingly connected to main drive shaft 16 beyond support block 22 from motor 12 and bearings 20, and is the component of coiling system 10 on which the tubing is actually coiled.

Figures 2A, 2B:
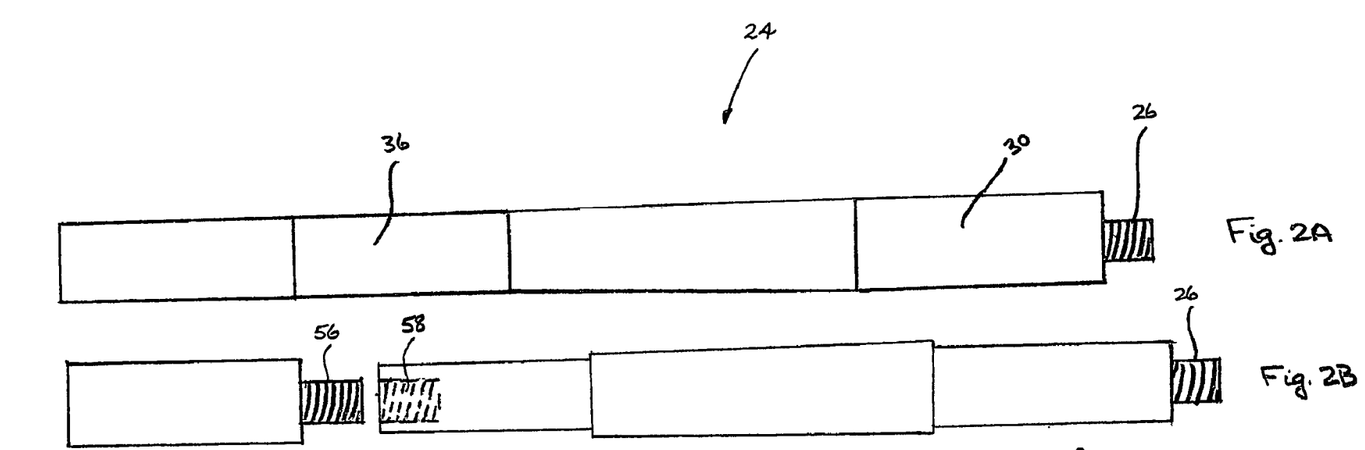
FIGS. 2A, 2B and 2C illustrate the construction of the main tube shaft used on the first embodiment of the coiling system.
Figure 2C:
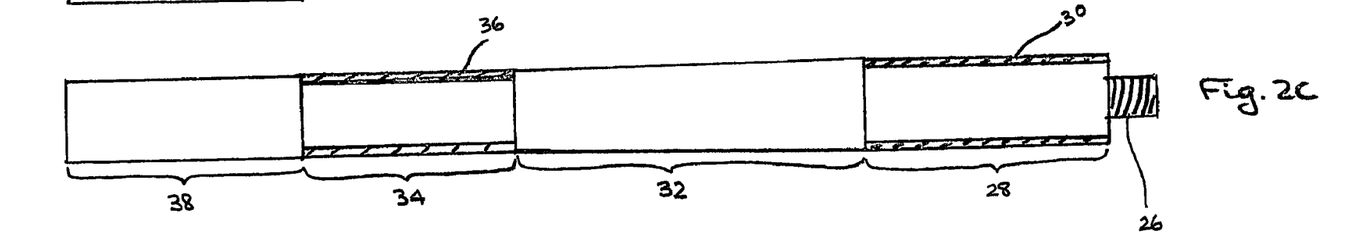

A more detailed view of main tube shaft 24 is provided in FIGS. 2A through 2C. Main tube shaft 24 may be seen to have four sections, as identified in FIG. 2C, and has a male threaded member 26 by which it is connected to main drive shaft 16 in FIG. 1. In a first section 28, main tube shaft 24 has a first diameter which includes a first sleeve 30 of UHMW polyethylene, shown sectioned in FIG. 2C, the purpose of which will be described below. First sleeve 30 may be readily removed by sliding from main tube shaft 24 and replaced when necessary.

In a second section 32, main tube shaft 24, which, for example, is made of aluminum or steel, tapers from the first diameter to a smaller second diameter. In a third section 34, main tube shaft 24 is of the second diameter which includes a second sleeve 36 of UHMW polyethylene, also shown sectional in FIG. 2C. The purpose of the second sleeve 36 will also be described below.

Finally, in a fourth section 38, which is threadingly connected to the rest of main tube shaft 24 at the end of the third section 34 by male threaded member 56 and female threaded hole 58, shown in phantom in FIG. 2B, to enable second sleeve 36 to be removed and replaced, main tube shaft 24 is of the second diameter. As in the second section 32, the main tube shaft 24 has a metal surface in the fourth section 38.

Turning now, back to FIG. 1, main tube shaft 24 passes through tube guide 40 beyond motor 12 and bearings 20. Tube guide 40 is shown in FIGS. 3A and 3B, the former being a plan view and the latter being a view looking down on the top edge in FIG. 3A.

Figure 3A:
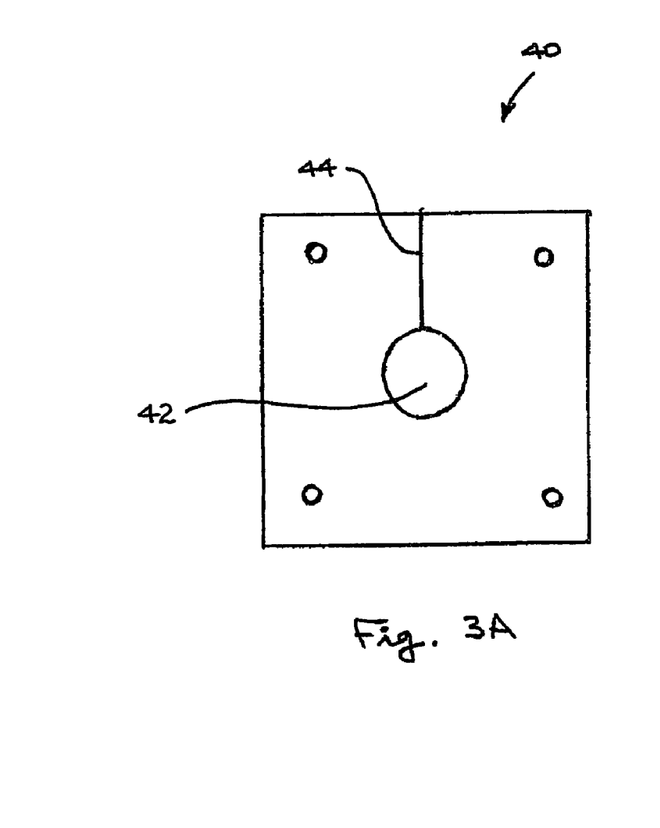
FIGS. 3A and 3B are plan and edge views, respectively, of the tube guide used on the first embodiment of the coiling system.
Figure 3B:
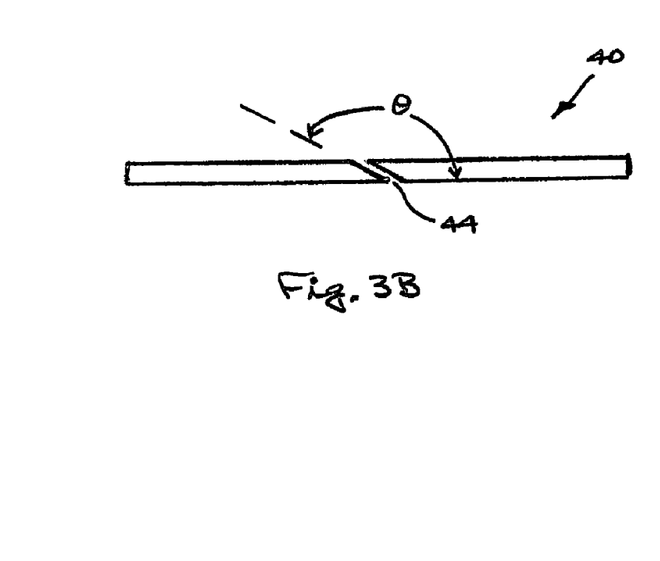

In FIG. 3A, tube guide 40 has a circular hole 42. Extending more or less radially upward from hole 42 is a gap 44. In FIG. 3B, gap 44 may be seen to provide an opening at an oblique angle θ relative to the plane of the tube guide 40. The gap 44 may, for example, make an angle of 158° with the plane of tube guide 40, an angle found empirically to provide the best results for forming coils of tubing having an outside diameter of 0.125 inch and a wall thickness of 30 mil, typical dimensions of the tubing that may be coiled with the present invention.

Turning, again, back to FIG. 1, gap 44 in tube guide 40 is directly above main tube shaft 24, which passes through hole 42 in tube guide 40. Typically, hole 42 has a diameter that is 0.25 inch larger than first diameter of first section 28 of main tube shaft 24, providing a clearance of 0.125 inch between the tube guide 40 and the main tube shaft 24 at the hole 42.

Coiling system 10 may be used either downstream from an extruder used to produce plastic tubing or off-line. In the latter situation, the plastic tubing has been previously extruded and wound onto a spool or reel, from which it may be fed to the coiling system 10. In either case, various pulleys and tensioners would be used to feed the tubing to the coiling system 10, as would be readily clear to those of ordinary skill in the art.

Referring again to FIG. 1, in either case plastic tubing, not shown in the figure, is fed between support block 22 and tube guide 40 and through gap 44. The tubing may additionally be passed through a hole in optional guide block 60 before entering the space between support block 22 and the tube guide 40. Motor 12 rotates main drive shaft 16 and main tube shaft 24 in the direction indicated by the arrows therearound, pulling the tubing through the gap 44 at the oblique angle the gap 44 makes with the plane of the tube guide 40, so that it is continually wound onto the main tube shaft 24 in the form of a helix. In this regard, first sleeve 30 of UHMW polyethylene assists in the winding of the tubing by virtue of the frictional forces acting therebetween. These frictional forces are greater than those that would act between the tubing and the bare metallic surface of the second portion 32 of the main tube shaft 24.

A heat source 46, which may be a precise heat gun, such as a Steinel 3002 LCD electronic hot air gun, or an oven, heats the coiled tubing to a temperature typically in a range from 400° F. to 700° F., the exact temperature used depending on the composition of the tubing being coiled. As the main tube shaft 24 rotates, the coiled plastic tubing traverses therealong past the heat source 46 and beyond.

Downstream from the heat source 46, that is, to its left in FIG. 1, is a cool-air source 48, such as one having a vortex cooling tube. The cool-air source 48 sets the previously heated tubing into coiled form. It will be recalled that second portion 32 of main tube shaft 24 tapers gradually from a first diameter to a second diameter which is slightly smaller. This ensures that the coiled tube will be readily removable from the main tube shaft 24 downstream from the cool-air source 48 as the coil will have a slightly larger diameter than the shaft 24 at that point.

Further downstream along main tube shaft 24, additional sources of compressed air may be directed at the coiled tubing to further cool and set it in its coiled form.

It will be further recalled that third section 34 of main tube shaft 24 has a second sleeve 36 of UHMW polyethylene. Adjacent to the second sleeve 36 is a cutter 50 having a blade 52. The cutter 50, when signaled by cutter controller 62, cuts the coiled tubing at intervals to produce desired lengths thereof. Blade 52 cuts the coiled tubing against second sleeve 36, which is much softer than a metal surface and prevents the blade 52 from wearing out too quickly.

Finally, downstream beyond the cutter 50 is an air ejector 54, or similar device, to remove the cut lengths of coiled tubing from the main tube shaft 24 when signaled to do so by air ejector controller 64.

In general, the main tube shaft 24 may have an outer diameter in a range from 0.1 inch to 20.0 inches and larger, although outer diameters in a range from 0.5 inch to 1.0 inch are more commonly used.

The plastic tubing itself may be extruded from any of the materials commonly used by those of ordinary skill in the art for that purpose. For example, the plastic tubing may be of polymers and copolymers of vinyls, olefins urethanes, such as polyvinyl chloride (PVC), polyethylene (PE), polyurethane (PU), TPE, COPE, ethylene-vinyl acetate (EVA), or may be of multi-layer coextrusions. The tubing may have an inner diameter in a range from 0.005 inch to 1.0 inch and a wall thickness in a range from 0.003 inch to 0.2 inch or more.

The plastic tubing may be coated with a heat-activated adhesive or sprayed with a solvent prior to coiling, so that the coiled tubing produced on the coiling system 10 may have individual coiled turns which are adhered to those adjacent to it.

The main tube shaft 24 and tube guide 40 together give the tubing the proper orientation to achieve a continuously coiling system. In this regard, gap 44, shown in FIG. 3B, is oriented at an oblique angle which may vary depending upon the diameter of the shaft and the outer diameter of the plastic tubing being coiled. As stated above, the oblique angle may be 158° in some situations. In any event, the gap 44 is at least 0.015 inch (15 mil) wider than the outer diameter of the plastic tubing being coiled to allow the tubing to pass freely therethrough.

Figures 4A, 4B:
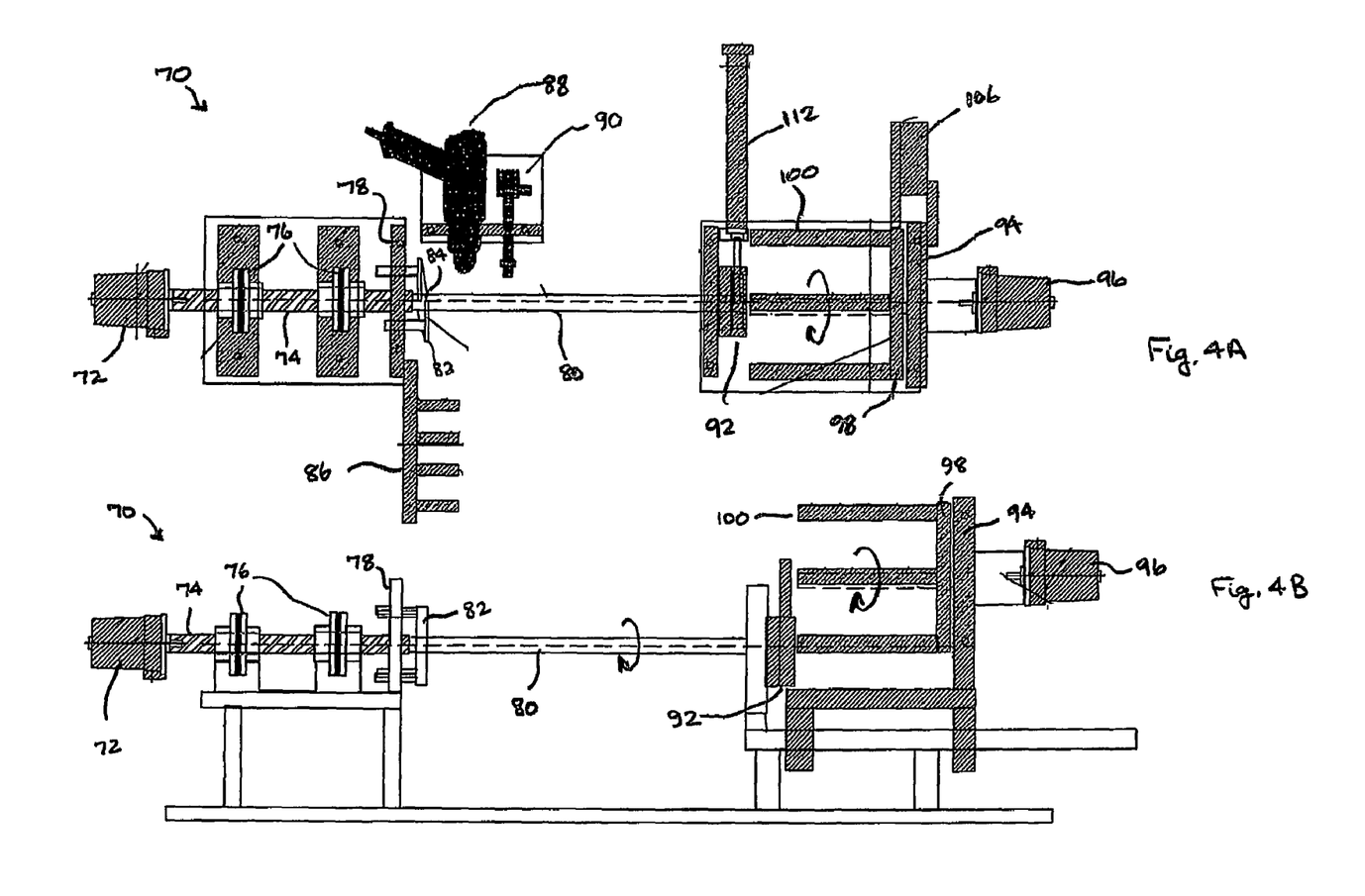
FIGS. 4A and 4B are top and side plan views, respectively, of a second embodiment of the coiling system of the present invention.

FIGS. 4A and 4B are top and side plan views, respectively, of a second embodiment of the coiling system 70. As above, coiling system 70 has a motor 72, which may be a stepper motor. Motor 72 may be set to rotate at speeds in a range from 1 RPM (rotation per minute) to 1000 RPM.

Motor 72 is connected to a main drive shaft 74, which rotates within bearings 76 and passes through a support block 78. A main tube shaft 80 is connected, such as by a threaded connection, to main drive shaft 74 beyond the support block 78 from motor 72 and bearings 74, and, again, is the component of the coiling system 70 on which the tubing is actually coiled.

Like main tube shaft 24 described above, main tube shaft 80 has a sleeve of UHMW polyethylene, not shown in FIGS. 4A and 4B, adjacent to main drive shaft 74 and extending a distance therefrom to facilitate the winding of tubing thereabout. Thereafter, the main tube shaft 80 tapers gradually along its length from a first diameter to a smaller second diameter to permit tubing coiled about it to be removed easily at the downstream end. Except for the UHMW polyethylene, main tube shaft 80 is made of aluminum or steel.

As before, main tube shaft 80 passes through a tube guide 82 beyond main drive shaft 74, bearings 76 and support block 78. Tube guide 82 is the same as tube guide 40 previously described, and has a gap 84 through which tubing is fed to be wound around main tube shaft 80.

Coiling system 70 also includes a tube tension controller 86 having individual pulleys and tensioners, not shown, but well known to those of ordinary skill in the art, to facilitate the feeding of the tubing to the coiling system 70.

In any event, plastic tubing, not shown in FIGS. 4A and 4B, is fed between support block 78 and tube guide 82 and through gap 84. Motor 72 rotates main drive shaft 74 and main tube shaft 80 in the direction indicated by the arrows therearound, pulling the tubing through the gap 84 so that the tubing is continually wound onto the main tube shaft 80 in the form of a helix.

A heat source 88, namely, a heat gun, heats the coiled tubing to a temperature typically in a range from 400° F. to 700° F., the exact temperature used depending on the composition of the tubing being coiled. As the main tube shaft 80 rotates, the coiled plastic tubing traverses therealong past the heat source 88 and beyond.

Downstream from the heat source 88, that is, to its left in FIG. 4A, is a cool-air source 90, such as a vortex cool-air gun. The cool-air source 90 sets the previously heated tubing into coiled form. It will be recalled that main tube shaft 80 tapers gradually from a first diameter to a second slightly smaller diameter. This ensures that the coiled tube will be readily removable from the main tube shaft 80 downstream from the cool-air source 90 as the coil will have a slightly larger diameter than the shaft 80 at that point.

Further downstream along main tube shaft 80, additional sources of compressed air may be directed at the coiled tubing to farther cool and set it into its coiled form.

Eventually, the coiled tubing takes up the entire length of main tube shaft 80, reaching the cutter 92 and carousel 94, which work together to provide coiled tubing of desired lengths. Turning first to the carousel 94, it comprises a stepper motor 96, which operates to rotate the carousel 94 by quarter turns (90°) at desired intervals. Carousel 94 also includes a plate 98 of generally circular shape. Evenly spaced about the circumference thereof are four shafts 100 having a diameter substantially equal to the second diameter of the main tube shaft 80. As the carousel 94 is rotated in quarter turns, each of the shafts 100 aligns, in turn, with the main tube shaft 80 for a desired interval of time. While so aligned, a length of coiled tubing proceeds from main tube shaft 80 onto individual shafts 100. At the end of the desired time interval, in which a desired length of coiled tubing is disposed on a shaft 100, the carousel rotates by a quarter turn in the direction indicated by the arrows in FIGS. 4A and 4B to bring the next shaft 100 into position. During this rotation of one quarter turn, the tubing is cut in a manner to be described below by cutter 92 to leave the desired length on shaft 100.

As the carousel 94 turns in steps by 90°, the lengths of coiled tubing may be removed from shafts 100, preferably after having rotated about the carousel 94 by three quarters of a turn, by any means available and known to those of ordinary skill in the art, such as by compressed air, so that the shaft 100 is able to accommodate a new length of coiled tubing as it moves into position in line with main tube shaft 80 when the carousel makes an additional quarter turn.

Figure 5:
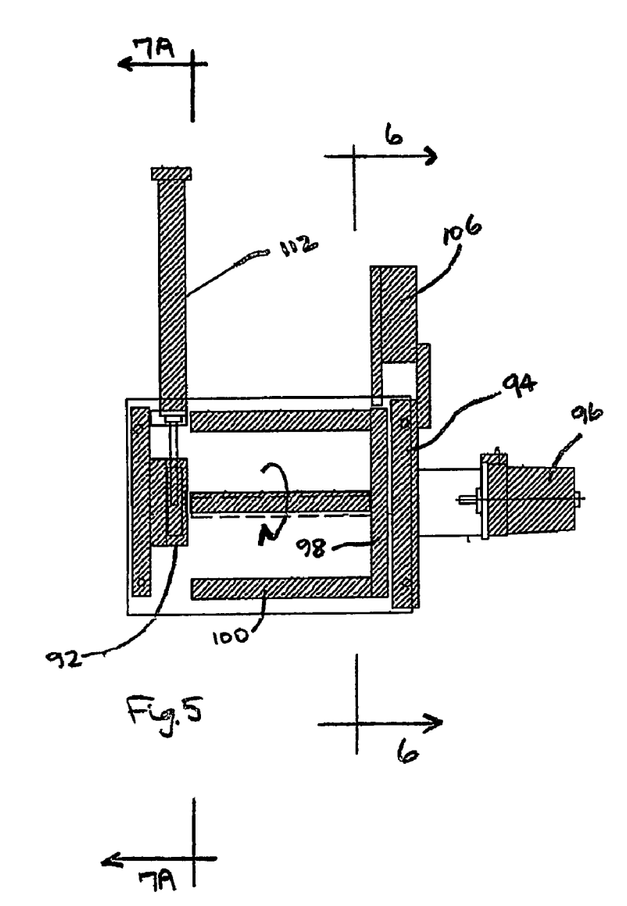
FIG. 5 is a plan view of the cutter and carousel components of the coiling system of FIGS. 4A and 4B.
Figure 6:
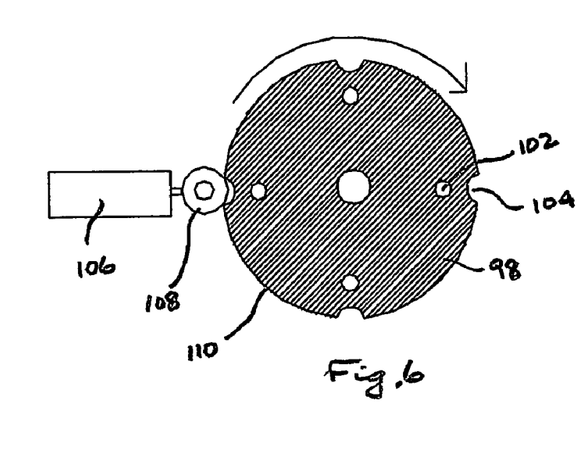
FIG. 6 is a cross-sectional view taken as indicated in FIG. 5.

FIG. 5 is a somewhat enlarged plan view of the cutter 92 and carousel 94, and FIG. 6 is a view of the plate 98 taken as indicated in FIG. 5. Stepper motor 96, as discussed above, rotates the carousel 94 in quarter-turn increments. Adjacent to each hole 102 for mounting a shaft 100 is a notch 104. Mounted on the carousel 94 is an electric solenoid 106 having a wheel 108 which partially engages notch 104. When stepper motor 96 begins a quarter rotation, wheel 108 is forced out of notch 104, engaging for a time with the circumferential edge 110 of the plate 98. This outward motion of the wheel 108 activates the solenoid 106, causing the cutter 92 to operate during the interval when the carousel 94 is making the quarter turn.

Figure 7A:
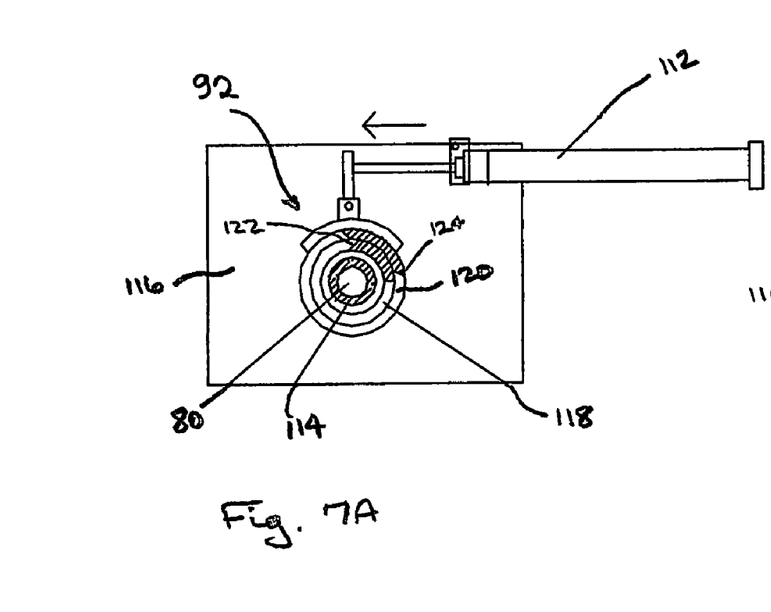
FIG. 7A is also a cross-sectional view taken as indicated in FIG. 5.
Figure 7B:
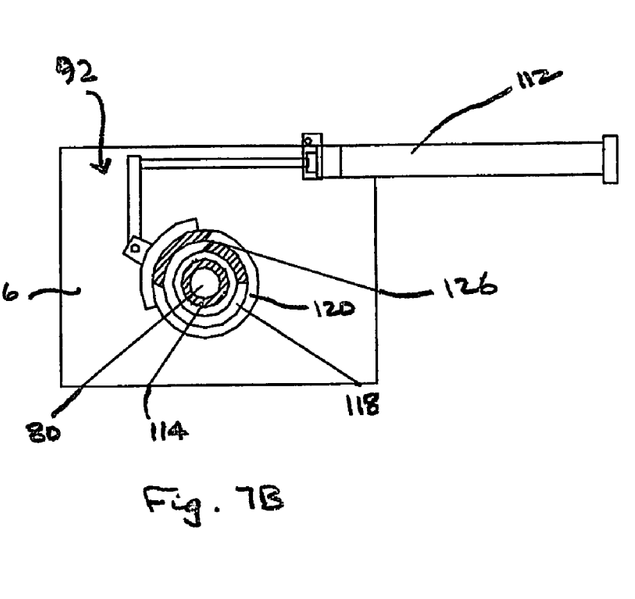
FIG. 7B is a cross-sectional view taken in the same manner as FIG. 7A when the cutter is activated.

FIG. 7A is a view of the cutter 92 taken as indicated in FIG. 5, and FIG. 7B is an analogous view taken when the cutter 92 has just completed a cutting stroke. The cutter 92 includes an air piston 112, which is activated when signaled by solenoid 106 to cut the coiled tubing.

Referring first to FIG. 7A, main tube shaft 80 extends through cutter 92 and is disposed in the center thereof. Coiled tubing 114 is wrapped around the main tube shaft 80. The cutter 92 itself is mounted on a stationary plate 116 through which the main tube shaft 80 also extends. The cutter 92 itself comprises a stationary inner element 118 having a cutting edge 122, and a rotatable outer element 120 having a cutting edge 124 which rotates the stationary inner element 118 by about 45° when the air piston 112 is activated, as shown in FIG. 7B. The cross-hatched portions of the inner element 118 and the outer element 120 are recessed relative to the other portions as viewed in FIGS. 7A and 7B. Accordingly, when the carousel 94 begins to make a quarter turn, a length of tubing extends from main tube shaft 80 to a shaft 100 through the area represented by the cross-hatched portions. Then, when the air piston is activated, the tubing is cut in a scissor-like manner when the cutting edge 124 of the outer element meets the cutting edge 122 of the inner element at point 126.

Modifications to the above would be obvious to those of ordinary skill in the art without bringing the invention so modified beyond the scope of the appended claims.

What is claimed is:

1. A coiling system for continuously forming coiled plastic tubing in preselected lengths, said coiling system comprising:
    a main tube shaft for forming plastic tubing into a helix, said main tube shaft having a longitudinal axis;
    a motor for rotating said main tube shaft about said longitudinal axis;
    a tube guide mounted with respect to a first point on said main tube shaft, said tube guide having a gap through which said plastic tubing is directed onto a predetermined point on said main tube shaft, said gap making an oblique angle with respect to said main tube shaft so that said plastic tubing may be wound onto said main tube shaft in a helical form;
    a heat source at a second point on said main tube shaft, said second point being downstream from said first point, said heat source being adapted to heat coiled plastic tubing at said second point;
    a cooling apparatus at a third point on said main tube shaft, said third point being downstream from said second point, said cooling apparatus being adapted to cool coiled plastic tubing at said third point to set said plastic tubing into a coiled form;
    a cutter at a fourth point on said main tube shaft, said fourth point being downstream from said third point, said cutter being adapted to cut coiled plastic tubing into preselected lengths by operating at preselected intervals of time; and
    a carousel for collecting preselected lengths of coiled plastic tubing cut by said cutter, said carousel having a plurality of shafts, each of said shafts being, in turn, aligned with said main tube shaft as said carousel is rotated for collecting a preselected length or coiled plastic tubing.

2. A coiling system as claimed in claim 1 wherein said main tube shaft tapers from one diameter to a smaller diameter along at least a portion of its length.

3. A coiling system as claimed in claim 1 wherein said motor rotates said main tube shaft at speeds in a range from 1 rotation per minute to 1000 rotations per minute.

4. A coiling system as claimed in claim 1 wherein said heat source is a heat gun.

5. A coiling system as claimed in claim 1 wherein said heat source heats coiled tubing to a temperature in a range from 400.degree. F. to 700.degree. F.

6. A coiling system as claimed in claim 1 wherein said cooling apparatus is a cool-air source.

7. A coiling system as claimed in claim 6 wherein said cool-air source has a vortex cooling tube.

8. A coiling system as claimed in claim 1 wherein said cutter includes a blade, said blade being adapted to cut said plastic tubing against said main tube shaft.

9. A coiling system as claimed in claim 1 wherein said fourth point is at an end of said main tube shaft opposite to said motor, and wherein said cutter surrounds said main tube shaft and is coaxial therewith, wherein said carousel is rotated stepwise at preselected intervals, and said cutter being adapted to cut said plastic tubing as said carousel is making a stepwise rotation.

10. A coiling system as claimed in claim 9 wherein said cutter has a stationary inner element and a rotatable outer element, each of said elements having a cutting edge adapted to cut plastic tubing in a scissor-like manner when said plastic tubing is stretched therebetween when said carousel makes a stepwise rotation.

11. A coiling system as claimed in claim 1 wherein said main tube shaft includes a first tube shaft portion located at said predetermined point on said main tube shaft and having a surface with a sufficient frictional force to assist in winding said plastic tubing onto said main tube shaft in a helical form.

12. A coiling system as claimed in claim 11 wherein said first shaft portion comprises UHMW polyethylene.

13. A coiling system as claimed in claim 11 wherein said main tube shaft includes a second tube shaft portion downstream of said first tube shaft portion and having a surface with a lower frictional force than said first tube shaft portion to assist in removal of said helically wound plastic tubing from said main tube shaft.

14. A coiling system as claimed in claim 13 wherein said second shaft portion comprises a metal surface.

15. A coiling system for continuously forming coiled plastic tubing in preselected lengths, said coiling system comprising:
  a main tube shaft for forming plastic tubing into a helix, said main tube shaft having a longitudinal axis and including a first tube shaft portion located at a predetermined point on said tube shaft and having a surface with a sufficient frictional force to assist in winding said plastic tubing onto said main tube shaft in a helical form, and a second tube shaft portion downstream of said first tube shaft portion and having a surface with a lower frictional force than said first tube shaft portion to assist in removal of said helically wound plastic tubing from said main tube shaft;
  a motor for rotating said main tube shaft about said longitudinal axis;
  a tube guide mounted with respect to a first point on said main tube shaft, said tube guide having a gap through which said plastic tubing is directed onto said predetermined point on said main tube shaft, said gap making an oblique angle with respect to said main tube shaft so that said plastic tubing may be wound onto said tube shaft in a helical form;
  a heat source at a second point on said main tube shaft, said second point being downstream from said first point, said heat source being adapted to heat coiled plastic tubing at said second point;
  a cooling apparatus at a third point on said main tube shaft, said third point being downstream from said second point, said cooling apparatus being adapted to cool coiled plastic tubing at said third point to set said plastic tubing into a coiled form; and
  a cutter at a fourth point on said main tube shaft, said fourth point being downstream from said third point, said cutter being adapted to cut coiled plastic tubing into preselected lengths by operating at preselected intervals of time.

16. A coiling system as claimed in claim 15 wherein said second shaft portion comprises a metal surface.

17. A coiling system for continuously forming coiled plastic tubing in preselected lengths, said coiling system comprising:
  a main tube shaft for forming plastic tubing into a helix, said main tube shaft having a longitudinal axis;
  a motor for rotating said main tube shaft about said longitudinal axis;
  a tube guide mounted with respect to a first point on said main tube shaft for winding said plastic tubing onto said main tube shaft in a helical form;
  a heat source at a second point on said main tube shaft, said second point being downstream from said first point, said heat source being adapted to heat coiled plastic tubing at said second point;
  a cooling apparatus at a third point on said main tube shaft, said third point being downstream from said second point, said cooling apparatus being adapted to cool coiled plastic tubing at said third point to set said plastic tubing into a coiled form;
  a cutter at a fourth point on said main tube shaft, said fourth point being downstream from said third point, said cutter being adapted to cut coiled plastic tubing into preselected lengths by operating at preselected intervals of time; and
  a carousel for collecting preselected lengths of coiled plastic tubing cut by said cutter, said carousel having a plurality of shafts, each of said shafts being, in turn, aligned with said main tube shaft for collecting a preselected length of coiled plastic tubing.

18. A coiling system as claimed in claim 17 wherein said fourth point is at an end of said main tube shaft, and wherein said cutter surrounds said main tube shaft and is coaxial therewith.

19. A coiling system as claimed in claim 18 wherein said carousel is rotated stepwise at preselected intervals and said cutter is adapted to cut said plastic tubing as said carousel is making a stepwise rotation.

20. A coiling system as claimed in claim 19 wherein said cutter has a stationary inner element and a rotatable outer element, each of said elements having a cutting edge adapted to cut plastic tubing in a scissor-like manner when said plastic tubing is stretched therebetween when said carousel makes a stepwise rotation.

* * * * *